United States Patent [19]
Fang et al.

[11] Patent Number: 6,122,408
[45] Date of Patent: *Sep. 19, 2000

[54] LIGHT NORMALIZATION METHOD FOR MACHINE VISION

[75] Inventors: Ming Fang, Cranbury; Richard D. Bang, Princeton, both of N.J.

[73] Assignee: Siemens Corporate Research, Inc., Princeton, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/640,347

[22] Filed: Apr. 30, 1996

[51] Int. Cl.$^7$ ..................................................... G06K 9/40
[52] U.S. Cl. ........................... 382/274; 250/205; 345/432
[58] Field of Search .......................... 382/118, 260–265, 382/274, 275, 100, 254; 250/205; 348/25, 251, 254; 358/461; 345/432

[56] References Cited

U.S. PATENT DOCUMENTS

| | | | |
|---|---|---|---|
| 5,012,333 | 4/1991 | Lee et al. | 358/520 |
| 5,153,926 | 10/1992 | Jansson et al. | 382/128 |
| 5,495,536 | 2/1996 | Osbourn | 382/199 |
| 5,561,718 | 10/1996 | Trew et al. | 382/118 |
| 5,768,482 | 6/1998 | Winter et al. | 358/1.9 |
| 5,867,166 | 2/1999 | Myhrvold et al. | 345/419 |
| 5,870,505 | 2/1999 | Wober et al. | 382/274 |

FOREIGN PATENT DOCUMENTS 93 04442   3/1993   WIPO ................... 382/274

OTHER PUBLICATIONS

Gonzalez, Digital Image Processing, pp. 191–4, 196–198, 1992.

Frankot, Robert T. et al., "A method for Enforcing Integrability in Shape from Shading Algorithms", IEEE, Jan. 1988.

Zheng, Qinfen et al. "Estimation of illuminant Direction, Albedo, and Shape from Shading", IEEE Jan. 1991.

*Primary Examiner*—Jon Chang
*Assistant Examiner*—Jayanti K. Patel
*Attorney, Agent, or Firm*—Donald B. Paschburg

[57] ABSTRACT

A method for normalizing the lighting changes in an input image made up of an X and Y array of pixels having various illuminating intensities, wherein the lighting changes having an additive effect and a multiplicative effect on the input image. The method comprises the steps of estimating the additive effect from the input image to provide a background estimate; estimating the multiplicative effect from the input image to provide a gain estimate; subtracting the background estimate from the image; and normalizing the image with respect to the gain estimate. Also described is an apparatus for automatically determining the identity of an image. The apparatus comprises video camera for acquiring the image to be recognized and a light normalizer coupled to the video camera for normalizing lighting changes in the image and producing a normalized image which can be more accurately recognized. Also included in the apparatus is an image recognizer coupled to the light normalizer, for receiving the normalized image and determining the identity of the image.

15 Claims, 9 Drawing Sheets

FIG. 6a
FIG. 6b
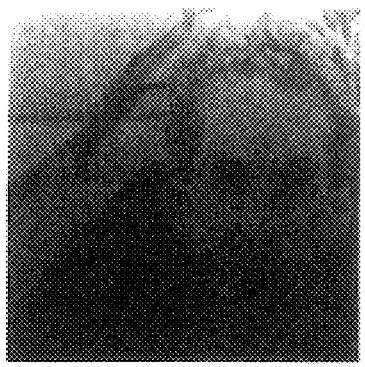
FIG. 6c
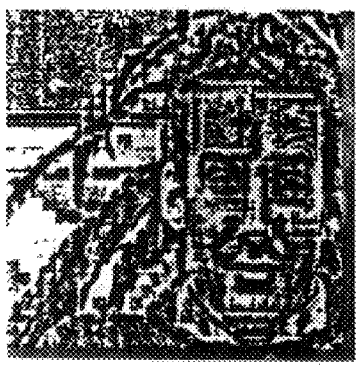
FIG. 6d
FIG. 6e
FIG. 6f
FIG. 6g
FIG. 6h

FIG. 8a  FIG. 8b  FIG. 8c
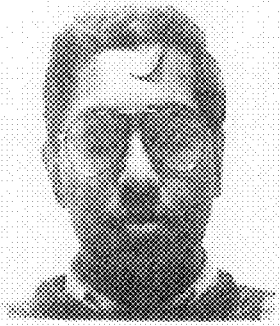  
 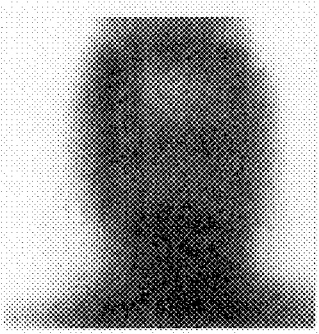 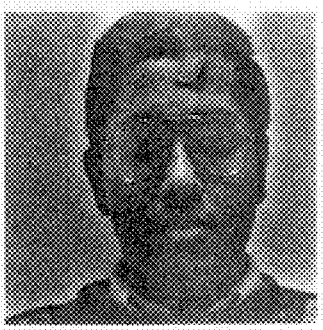
FIG. 8f  FIG. 8d  FIG. 8e
FIG. 9a  FIG. 9b  FIG. 9c
  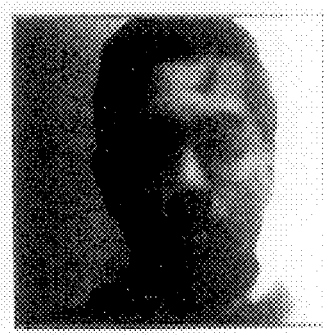
 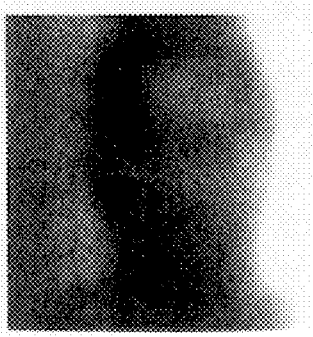 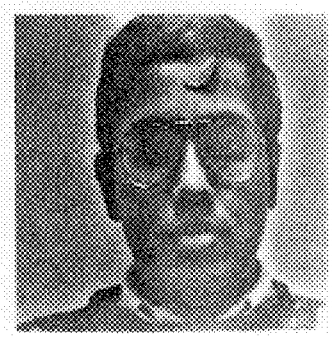
FIG. 9f  FIG. 9d  FIG. 9e FIG. 12b (2∞, none, 45%, 128)

FIG. 12c (2,16,none, 45%, 128)

LIGHT NORMALIZATION METHOD FOR MACHINE VISION

FIELD OF INVENTION

The present invention relates generally to machine vision and more particularly, to a method for image contrast enhancement which provides an image that is relatively invariant to changes in the illumination of the image.

BACKGROUND OF THE INVENTION

Machine vision has many commercial applications and therefore, has attracted much attention in recent years. Accordingly many machine vision techniques and methods have been developed for detecting various image patterns and objects including deformable objects such as human faces.

The ability to recognize an image pattern or object such as a human face is an important machine vision problem. Present face recognition methods used in person identification systems, typically employ a face recognizer which determines the identity of a human face image. In order to identify the image the system compares the face to other faces stored in a database in order to identify the person. Systems used in many visual monitoring and surveillance applications, accomplish person identification by a process whereby the system determines the position of the human eyes from an image or an image sequence containing the human face. Once the position of the eyes is determined, all of other important facial features, such as the positions of the nose and the mouth, are determined by methods that use correlation templates, (2) spatial image invariants, (3) view-based eigen-spaces, etc. The use of one of these methods enables the system to recognize a face from a given face database, and can also be used to perform a variety of other related tasks.

A key issue and difficulty in face recognition is to account for the wide range of illumination conditions which can exist in an image. Existing methods find this task difficult to impossible when an illumination change, such as a shadow, is in the image of interest. This is usually due to the system's inability to distinguish between the background light and the foreground object. Face recognition in commercial outdoor applications such as ATM access control, surveillance, video conferencing, and the like, typically involves images with varying light conditions. Such applications pose one of many major challenges for conventional machine vision techniques which were primarily developed for applications involving controlled lighting conditions.

The prior art has proposed many image enhancement techniques and methods. A popular one of these methods removes the unwanted shadow effect in an image by subtracting off a low-passed version of the image with a large kernel size. The operates to remove the slowly varying lighting condition which is often associated with the shadow or back-ground lighting. However, it is often not possible to accurately model a lighting change in an image as a simple additive effect. In practice, prior art image enhancement methods amplify the range of dark to bright in an image, which is similar to the effect of increasing the gain of a camera.

It is, therefore, an object of the present invention to provide an improved image enhancement method that can be used as a preprocessing step to subsequent vision processing techniques, which generates an image that is substantially invariant to lighting changes.

SUMMARY OF THE INVENTION

A method for normalizing the lighting changes in an input image comprised of an X and Y array of pixels having various illuminating intensities, wherein the lighting changes having an additive effect and a multiplicative effect on the input image. The method comprises the steps of:

estimating the additive effect from the input image to provide a background estimate;

estimating the multiplicative effect from the input image to provide a gain estimate;

subtracting the background estimate from the image; and normalizing the image with respect to the gain estimate.

Also described is an apparatus for automatically determining the identity of an image. The apparatus comprises imaging means for acquiring the image to be recognized and light normalizer means coupled to the imaging means for normalizing lighting changes in the image and producing a normalized image which can be more accurately recognized. Also included in the apparatus are image recognizer means coupled to the light normalizer means for receiving the normalized image and determining the identity of the image.

BRIEF DESCRIPTION OF THE DRAWINGS

For a detailed understanding of the present invention, reference should be made to the following detailed description taken in conjunction with the accompanying drawings wherein:

FIGS. 5a–h, 6a–h, and 7a–h, compare standard and subspace histogram processing results with the method of the present invention;

FIGS. 8a–f, 9a–f, 10a–d and 11a–f show the results at important stages in the present method; and FIGS. 12a–e depict other operating points of the method of the present invention.

DETAILED DESCRIPTION OF THE INVENTION

The image enhancement method of the present invention employs an adaptive local histogram modification with background estimation as a preprocessing step to provide an image that is substantially invariant to global lighting changes and adjustably tolerant to local lighting changes such as shadows. This is accomplished in the present invention by adjusting various parameters which results in images which can vary from being very hard (nearly binary black/white) or very soft and relatively untouched can be obtained. Accordingly, subsequent machine vision processing steps can make use of the lighting invariant image produced by the present method to simplify computations and increase their robustness under varying lighting conditions.

Although the method of the present invention can be used in generic machine vision applications such as those involving patterns or objects, the method is especially suited for use in face recognition. Accordingly the present method will be described in this context.

Figure 1:
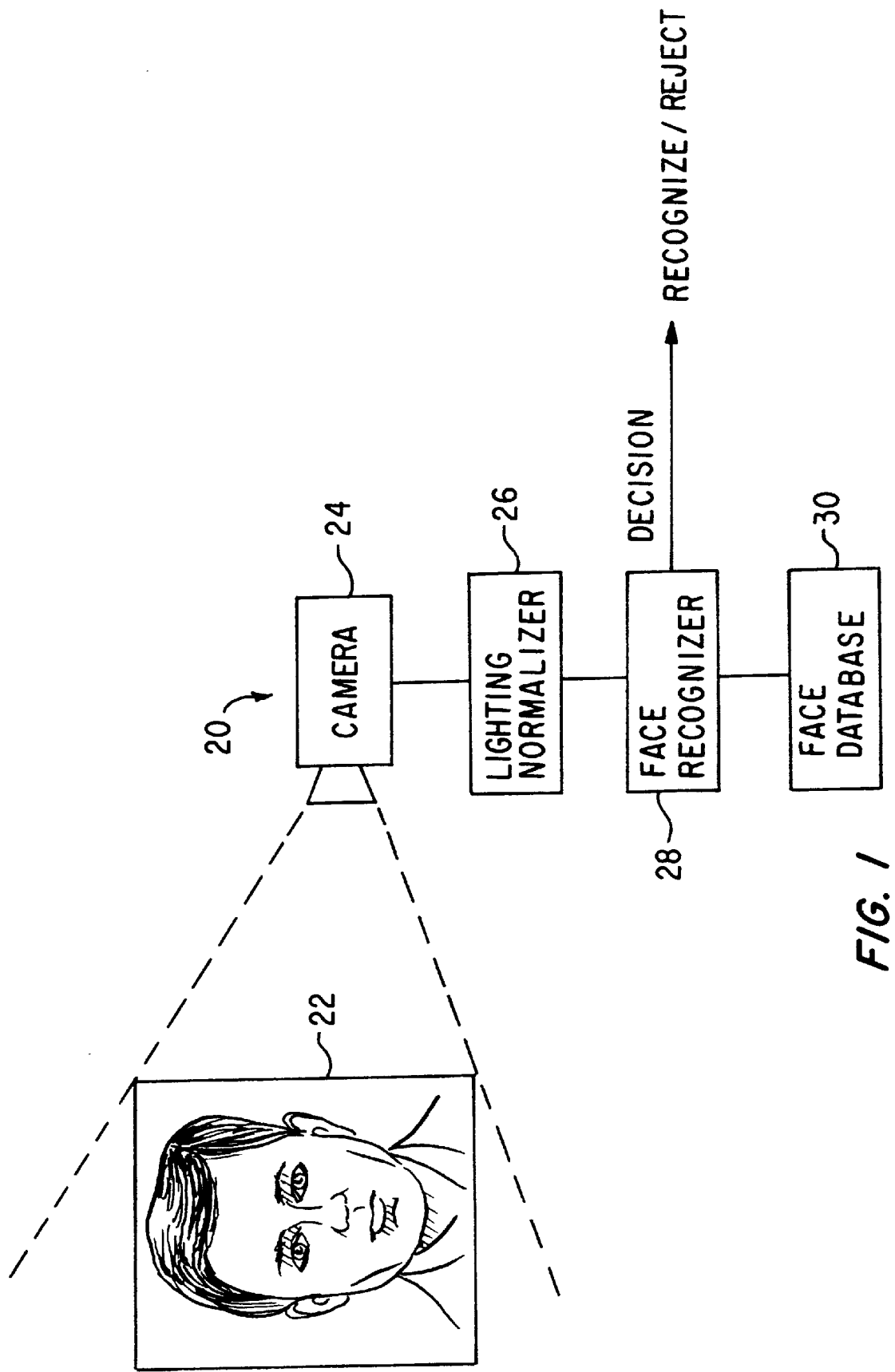
FIG. 1 is a diagrammatic view of an exemplary face recognition system for implementing the method of the resent invention.

The method of the present invention can be implemented in a fully automatic image recognition system such as the face recognition system shown in FIG. 1. The system 20 comprises a video camera 24 for inputing an image 22 (face image in this embodiment) with lighting changes. The face image 22 is made up of a predetermined number pixels for example, 320 by 240 pixels. A lighting normalizer 26, which is coupled to the video camera 24, receives the inputed face image 22 and outputs a lighting normalized face image which is transmitted to a face recognizer 28 coupled thereto. The face recognizer 28 includes a memory 30 which operates as a database for storing images of different human faces. The face recognizer 28 can be embodied as a decision-based neural network face recognizer (DBNN) or any other well known face recognizer. The face recognizer 28 determines the identity of the normalized face image 22. Thus, the lighting normalizer produces a normalized face image which can be more accurately processed by the face recognizer 28.

Figure 2:
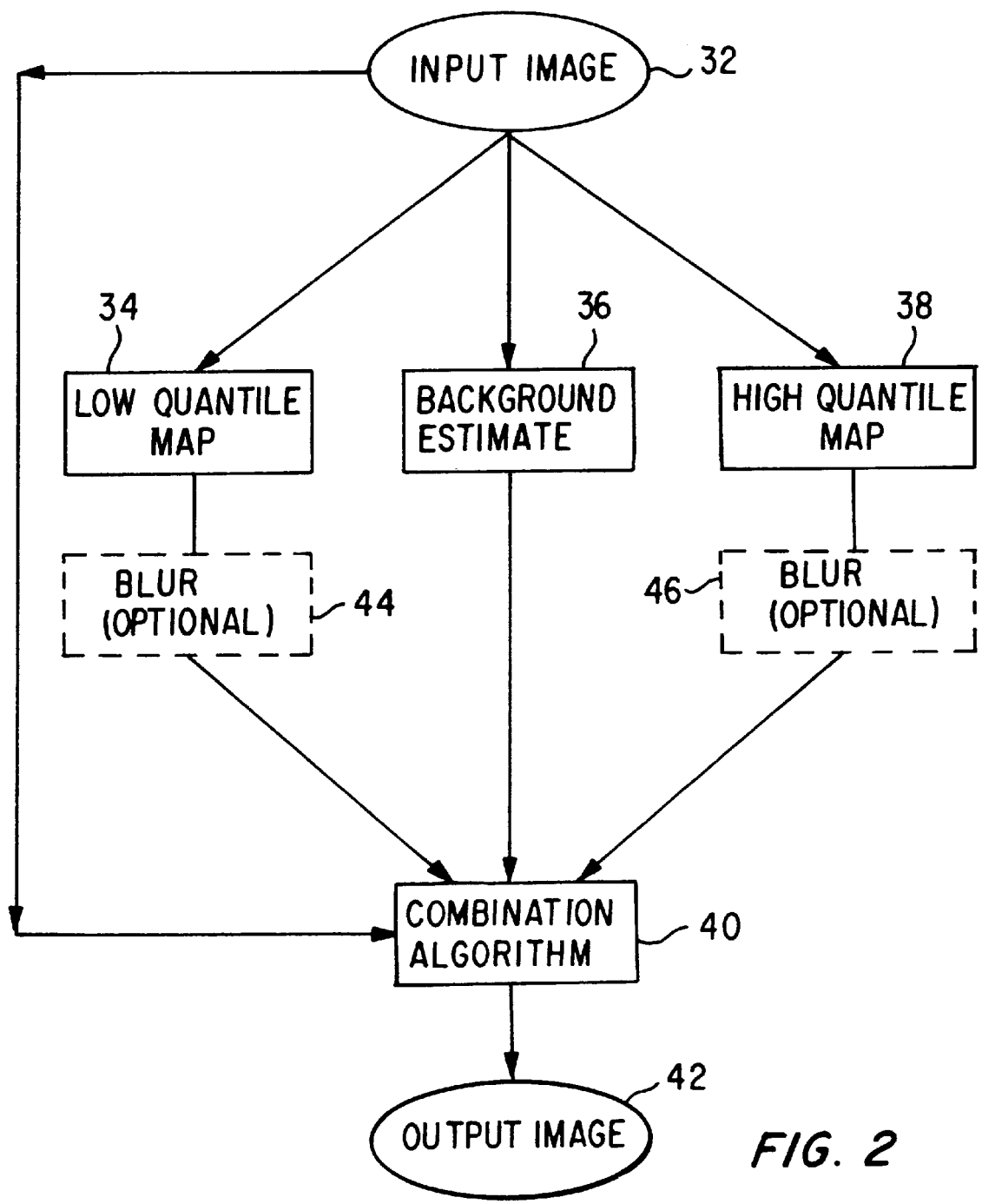
FIG. 2 is a signal flowchart of the method of the present invention.

Referring to FIG. 2, the basic concept of the present method is to normalize the contrast of the input image 32 of interest. More specifically, the lighting normalizer includes three digital filters implemented preferably on a computer in the lighting normalizer, which filter the image into a high quantile map 38 of the image's bright area, a low quantile map 34 of the image's dark areas and an estimate of the background 36. The high and low quantile maps 38, 34 and the background estimation 36 are then combined 40 to normalize the high and low quantile maps to some adjustable value to produce a normalized output image 42.

Figure 3:
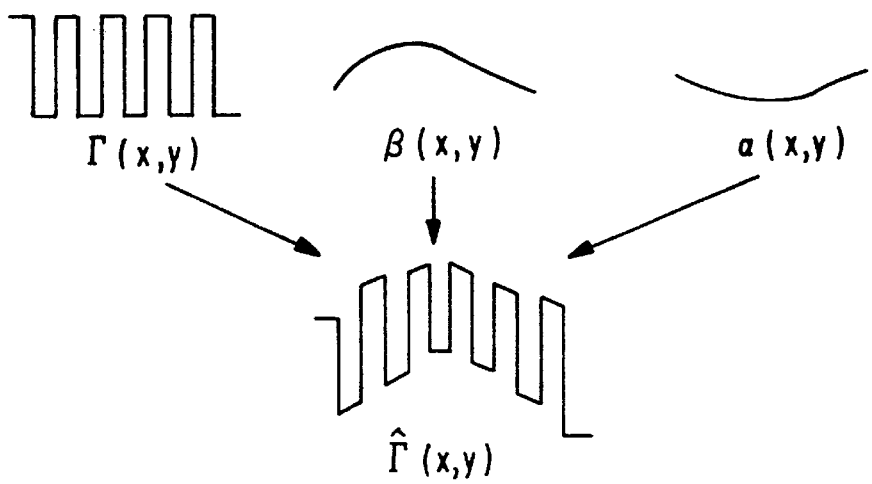
FIG. 3 graphically describes how the method of the present invention operates to normalize an image with lighting changes.
Figure 3:
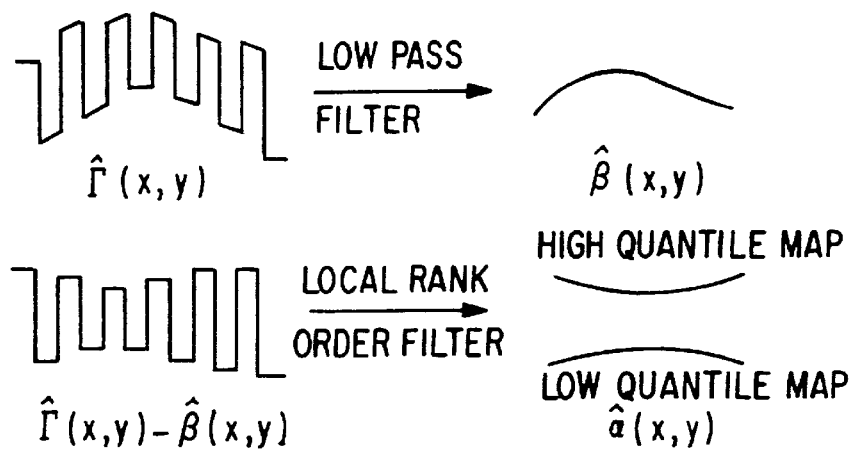

As stated earlier, a traditional method of removing a unwanted shadow effect in an image is to subtract off a low-passed version of the image with a large kernel size. This operates to remove the slowly varying lighting condition which is often associated with the shadow or background lighting. In contrast and as illustrated in FIG. 3, the method of the present invention employs a lighting model as a local affine transformation of the pixel value rather than an additive one. The lighting model is mathematically depicted as:

$$\hat{\Gamma}(x,y) = \alpha(x,y) \cdot \Gamma(x,y) + \beta(x,y)$$

where $\Gamma(x,y)$ is the original image and $\hat{\Gamma}$ is the effect of the local lighting. Thus, the lighting change has both an additive and multiplicative effect on the image.

The normalizer used in the method of the present invention substantially removes the additive and multiplicative effects by first subtracting off a lowpass estimate and then normalizing with respect to a gain estimate. This process can be expressed as:

$$\tilde{\Gamma}(x,y) = \frac{\kappa}{\hat{\alpha}(x,y)} \cdot (\hat{\Gamma} - \hat{\beta}(x,y))$$

the above algorithm being implemented on the computer of the normalizer to normalize the image. If the estimates $\hat{\alpha}(x,y)$ and $\hat{\beta}(x,y)$ are absolutely correct, then the original image will be reconstructed. However, since the estimates must be obtained from the image itself, processing the original desired image to normalized the lighting will not ensure that the original image will result at the output.

Therefore, in the present method, it has been chosen to estimate the additive effect $\hat{\beta}(x,y)$ by a multiresolution-based lowpass filter, which approximates a large kernel lowpass filter, and to estimate the gain $\hat{\alpha}(x,y)$ by measuring the high and low quantile maps with a rank order filter. In so doing, $\hat{\alpha}(x,y)$ is taken to be the maximum absolute difference between the high and low quantile maps and the background estimate $\hat{\beta}(x,y)$. This makes $\hat{\alpha}(x,y)$ the smallest positive gain such that one of the quantile points reaches $\kappa$ or $-\kappa$.

In the preferred embodiment, the estimates of the gain $\hat{\alpha}(x,y)$ are lowpassed via the same multiresolution-based technique used to estimate the background as will be discussed later. This is performed in order to blur the gain estimates of the high and low quantile maps 46 and 44 to the same degree as that of the background estimate 36 as depicted in FIG. 2. It should be understood, however, that blurring isn't required if a larger neighborhood size is taken for the high and low quantile maps although, the resulting images appear slightly better. Intuitively, the high and low quantile maps attempt to estimate the "envelope" of the image.

The constant $\kappa$ and the quantile maps operate together to determine the "degree" of stretching. The quantile maps, which are provided by a fast order filter, are an image of quantile points. For example, given a setting of 10%, the high quantile map at a given point returns the largest pixel value when 10% of the local neighboring pixels at the given point still have values of brightness greater (brighter) than the given point. Similarly, for setting of 10%, the low quantile map at a given point returns the smallest pixel value when 10% of the local neighboring pixels at that given point have values of brightness smaller (darker) than the given point. More simply, a 10% low quantile percentage corresponds to a 10% rank and a 10% high quantile percentage corresponds to a 90% rank.

Since the image must be clipped to its data range for display or storage, a large value of $\kappa$ and a large quantile percentage on the order of for example, approximately but less than 50%, will provide a nearly binarized image. At the other extreme, a small value of $\kappa$ and a small quantile percentage on the order of for example, 0% (so that a minimum and maximum filter will be essentially provided) will flatten the image to a dull grey. A more useful operating point occurs with a large value of $\kappa$ (the maximum positive pixel value) and a small quantile percentage.

It should be noted there are other operating points other than what was used the above examples. In particular, there are operating points produced by balancing and increasing the quantile percentage with a decrease in the scaling constant $\kappa$. From a statistical standpoint, this has the effect of leaving room for the "tails" of the local distribution rather than losing the information ("tails") through clipping.

The lowpass filter used for estimating the background lighting should have a very large kernel size in order to eliminate DC and typical shadows in later processing. However, such filters are computationally time consuming. For example, a separable n×n Gaussian blur costs 2n multiplications per pixel. Accordingly, for n=64, the computations would take too long for practical purposes. Therefore, in the preferred embodiment of the present invention, a fast approximate lowpass filter based on multiresolution is used. The approximate lowpass filter can be created by taking nonoverlapping block averages in the image to provide a low resolution image representation. The low resolution image is then rescaled in a series of stages whereby each intermediary stage resealing produces a resolution that approaches closer to the original resolution. This is necessary in order to avoid very apparent blockiness of the image which would result from a simple resealing of the low resolution image to the original resolution.

It should be understood, however, that any suitable multiresolution lowpass filtering technique can be employed in the present invention. One such example is described in an article entitled "FAST FILTER TRANSFORMS FOR IMAGE PROCESSING" by P. Burt, *Computer Graphics and Image Processing*, 16:20–51, 1981, a multiresolution pyramid technique is described for both downsizing and upsizing the image. In the present invention, multiresolution is preferred only for upsizing the image because it smooths out the resulting image. On the other hand the downsizing process of the present invention employs the simple block average subsampling technique described earlier to increase the speed of the process.

Figure 4:
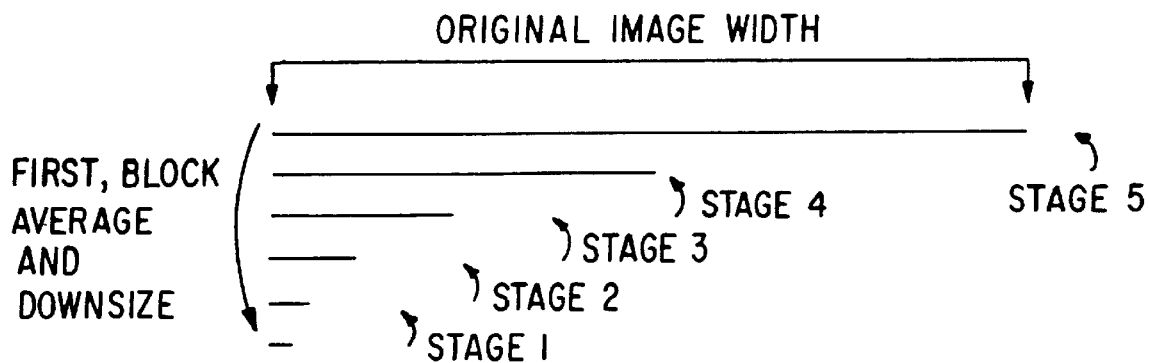
FIG. 4 is a one dimensional cross-section depicting the multiresolution lowpass filter employed in the present invention.

Referring to FIG. 4, which for simplicity illustrates a 1 dimensional cross section of the multiresolution lowpass filter of the present invention, after block averaging and downsizing the image, each of the intermediary resolutions performed during image rescaling doubles the size of the coarse image. The coarse size doubled image is then filtered (interpolated) with a 5×5 filter. If the coarsest resolution was obtained from the original image using a neighborhood size of $2^n \times 2^n$, the average number of multiplications per original image pixel can be worked out to be:

$$20 \sum_{k=1}^{n} \frac{1}{4^k}$$

If the neighborhood size is 32(n=5), then on average, less than 7 multiplications per original image pixel will be necessary. The additions work out to less than 3, however, the 5×5 kernel on the lowest scale corresponds approximately to a 96×96 kernel size in the original scale where the initial block average has weights extending this far. Comparing a substantially equivalent separable lowpass filter to the multiresolution lowpass filter of the present invention, the separable lowpass filter would take 192 multiplications. Thus, the multiresolution lowpass filter of the present invention produces a 96% savings in the multiplications over the separable lowpass filter. Further, additional savings in the multiplications can be achieved by not multiplying each filter coefficient until later in the process (the 1D cross-sectional weights are Additionally, the impulse response of the multiresolution lowpass filter is less blocklike and has the added benefit of generating a family of lowpass approximations as a by-product: one approximation for each resolution. Such a benefit can be useful for later image processing.

In any case, since each stage of the multiresolution lowpass filter of the invention doubles the image width and height, the preferred size for the averaging block is a power of 2. The size for the averaging block, however, can be appropriately modified to handle other suitable block sizes. For example, if the block size is not the preferred power size of 2, the method handles this by overshooting the image size and then resizing the overshot image to the appropriate size.

Implicit in the present method are the neighborhood sizes of the multiresolution lowpass filter, the high quantile map filter, and the low quantile map filter. For simplicity, the neighborhood size for both the high and the low quantile maps are selected to be identical. Similarly, the quantile percentages for both the high and the low maps are selected to be identical. This maintains symmetry between the high and low maps and therefore, desirably produces a negated output when the input is negated (this property would be broken if the high and low filters were asymmetrical).

This provides a total of 2 or 3 neighborhood sizes depending on whether the optionally provided blurring of the gain estimates are included. Also provided is a quantile percentage and a scaling constant that describes the operating point of the entire method. The scope of the operating points listed above enables the image to be preprocessed in many ways. More specifically the ranges of the parameters are:

High and low map neighborhood size: 1–∞ pixels

Background estimate neighborhood size: 1–∞ pixels

Optional high and low blur size: 1–∞ pixels

High and low quantile percentages: 0–50%

Scaling Constant: 1–128 (for a signed byte image)

A property of the present method is that a combination rule is computed using estimated characteristics of the image which can all be done in parallel. The method can also be simply modified to disable or replace one of the components. For example, the lowpass background estimator can be replaced with something more elaborate (e.g. large kernel median filter). Similarly, more elaborate filters can be substituted for the high quantile map and/or low quantile map.

Furthermore, the present method enables one to simulate a disabled component if desired, by moving the operating point to a suitable location. For example, a disabled background estimator can be approximated by setting the background estimate neighborhood size to a.

The method of the present invention relates to standard and subspace histogram modification of an image as follows. Standard histogram modification of an image is essentially a global pixel range rescale of the image of interest. In the present lighting model framework, this is analogous to ignoring the additive component $\hat{\beta}(x,y)$ of the lighting change and estimating the multiplicative effect $\hat{\alpha}(x,y)$ as being constant. This effect can be fairly well simulated by forcing the background estimate and high and low maps to be constant (high and low map neighborhood size equal to ∞). Subspace histogram modification is a standard histogram modification applied separately to non-overlapping sub-blocks that cover the image. If the background estimate and high and low maps are forced to be constant, a subspace histogram modification can be simulated as well.

Subspace histogram modification essentially use one neighborhood size and does not consider relative intensity relations to image's background when doing enhancement. This leads to noticeable block effects after image enhancement. Using only one neighborhood window, image enhancement is made without concern to the image's intensity relation to the surrounding neighbors.

Since the method of the present invention is so flexible, the relative sizes between the background and the high/low neighborhood window sizes can be selected to be different. By selecting the neighborhood size of the background estimate window to be larger than the high/low neighborhood size, the pixels in the small window can be enhanced using information from the larger window. Even when the high/low maps are forced to be constant on each sub-block, the block effects using the present method is comparatively much less as will be illustrated shortly. Additionally, bright regions in one sub-block do not suddenly become dark in another, thus, the brightness order relationship is preserved unlike subspace-histogram modification.

Figure 5A:
Figure 5B:
Figure 5C:
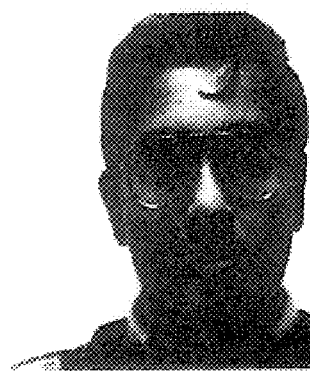
Figure 5D:
Figure 7A:
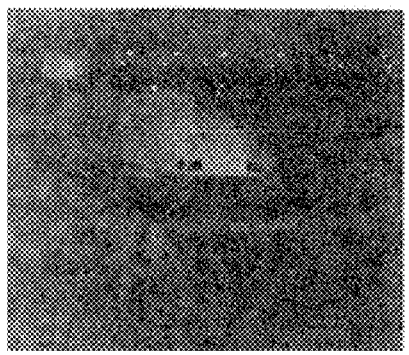
Figure 7B:
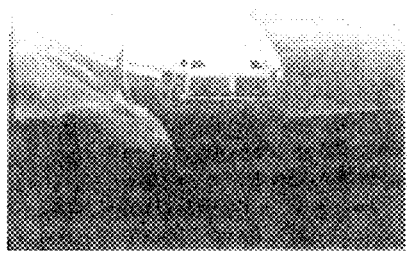
Figure 7C:
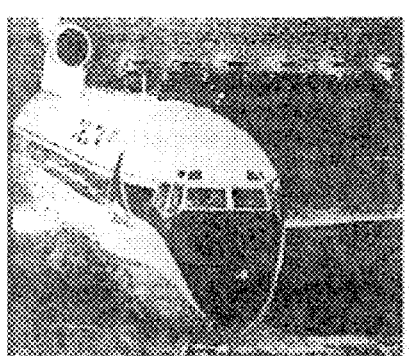
Figure 7D:
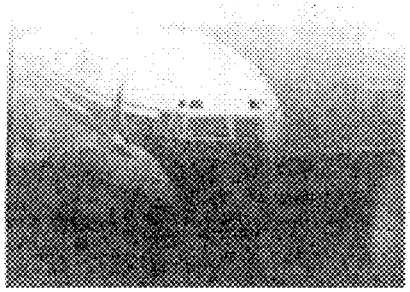

The following discussion illustrates the results of the present method. In FIGS. 5a–h, 6a–h, and 7a–h, comparison is made between standard and subspace histogram processing results and the method of the present invention. FIGS. 5a, 6a, and 7a illustrate the original image. FIGS. 5b, 6b, and 7b show the original image of respective FIGS. 5a, 6a, and 7a with simulated shadows. In FIGS. 5c, 6c, and 7c, standard global histogram modifications of the respective original images of FIGS. 5a, 6a, and 7a are shown. FIGS.

Figure 5E:
Figure 5F:
Figure 5G:
Figure 5H:
Figure 7E:
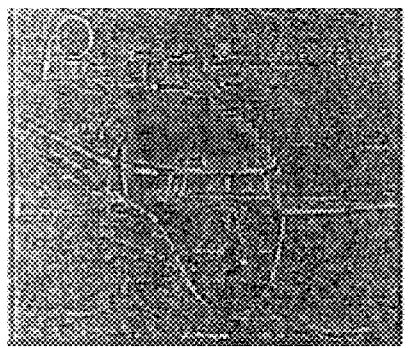
Figure 7F:
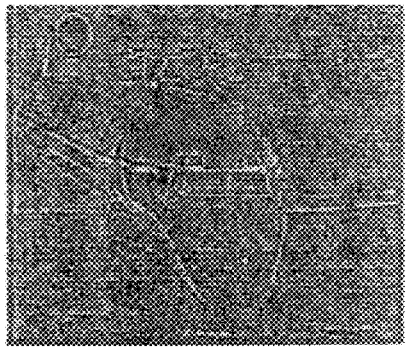
Figure 7G:
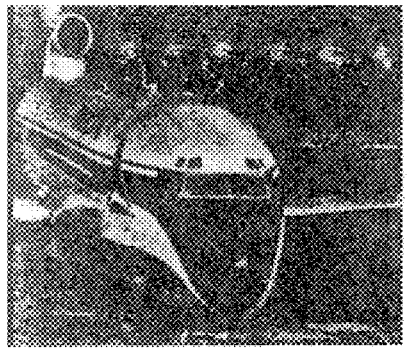
Figure 7H:
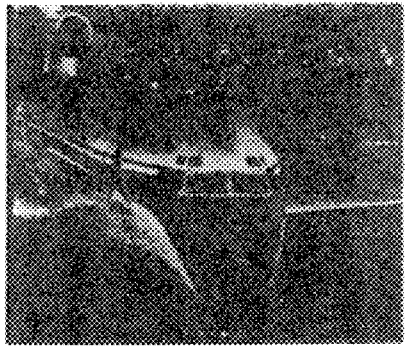

5d, 6d, and 7d show standard global histogram modifications of respective FIGS. 5b, 6b, and 7b. In FIGS. 5e, 6e, and 7e, subspace histogram modifications of the respective original images of FIGS. 5a, 6a, and 7a are shown. FIGS. 5f, 6f, and 7f show subspace histogram modifications of respective FIGS. 5b, 6b, and 7b. FIGS. 5g, 6g, and 7g illustrate the method of the present invention with background estimation as applied to the original respective images of FIGS. 5a, 6a, and 7a. FIGS. 5h, 6h, and 7h illustrate the method of the present invention with background estimation as applied to the original respective images of FIGS. 5b, 6b, and 7b.

In regard to FIGS. 5a–h, 6a–h, and 7a–h described immediately above, high and low quantile maps were forced to be constant on each sub-block for the method by computing histogram quantiles only once for each sub-block rather than for a sliding window. The operating points for the set of images are: a lowpass neighborhood size of 32×32, an enhancement sub-block 4×4, high/low quantiles of 25%, and no additional blurring. The advantages of having a background estimate and using two neighborhoods are apparent from the FIGS. Further, typical unoptimized computing times for the images was under one second on a SPARC 10.

In FIGS. 8a–f and 9a–f, images showing the results at different processing stages of the present method are shown. In particular, FIG. 8a depicts a dark original image of a face without a lighting gradient and FIG. 9a depicts an original image of a face with a lighting gradient. In FIGS. 8b, 9b and 8c, 9c respective low and high quantile maps have been computed from the rank order filter used in the present invention. The low quantile maps of FIGS. 8b, 9b and the high quantile maps of FIGS. 8c, 9c look similar since they were both set to 45% for the displayed images (producing a 45% rank order for the low quantile map and a 55% rank order for the high quantile map). Note that, since the low and high quantile maps of FIGS. 8b, 9b and 8c, 9c were computed from a rank order filter, the images do not have block effects. FIGS. 8d, 9d depict the background estimates and FIGS. 8e, 9e depict the background subtracted. The gain renormalized results or output images are shown in FIGS. 8f, 9f. The notation for each of these images is "hi/lo enhancement neighborhood size, lowpass neighborhood size, hi/lo blur neighborhood size, hi/lo quantile percentages, and the scale constant ∞".

Figure 10A:
Figure 10B:
Figure 10C:
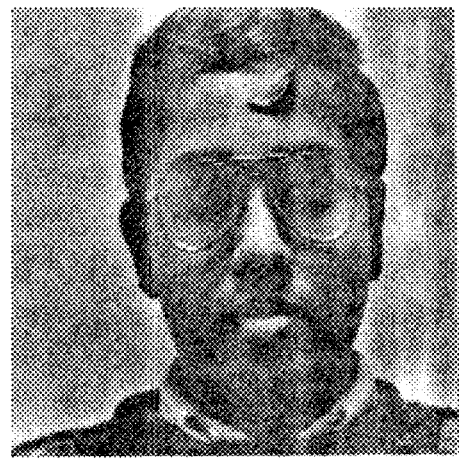
Figure 10D:
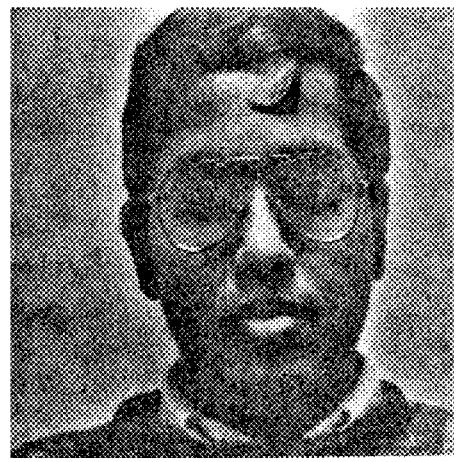

In FIGS. 10a–d, direct comparisons between the input and output images for a face (respective FIGS. 10a and 10c) and for a face with a lighting gradient (respective FIGS. 10b and 10d) are shown. Note the difference in the lighting conditions of the input images of FIGS. 10a and 10b and how the output results of FIGS. 10c and 10d are similar.

Figure 11A:
Figure 11B:
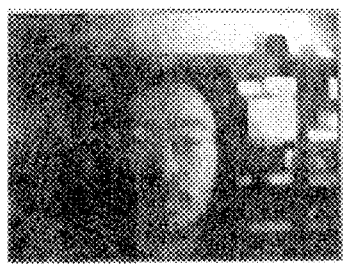
Figure 11C:
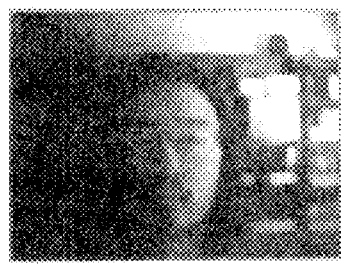
Figure 11F:
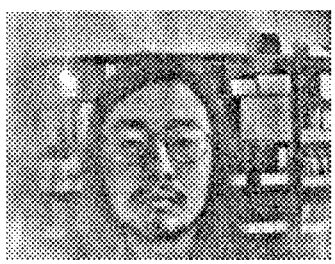
Figure 11D:
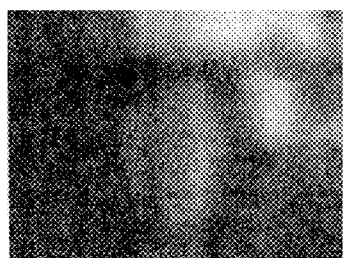
Figure 11E:
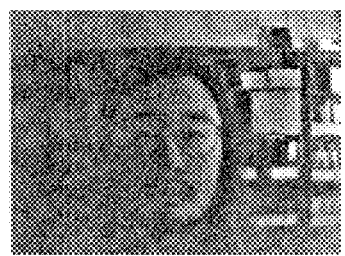
Figure 11E:

FIGS. 11a–f illustrate the advantage of estimating the gain. FIG. 11a again depicts an original image of a face with a lighting gradient. Note that the low contrast on the left side of FIG. 11e (background subtracted) as compared to its right side. Using the low and high quantile maps of FIGS. 11b and 11c (set to 45%), one can compensate for the effect of FIG. 11e to obtain the final result in FIG. 11f which displays substantially improved contrast balance. FIG. 11d depicts the background estimate.

Figure 12A:
Figure 12A:
Figure 12A:
Figure 12A:

The images depicted in FIGS. 12a–e show some other operating points of the present method. As can be seen, changing the different parameters can achieve many different effects. For example, FIG. 12a is an original face image with a lighting gradient. With the operating points set at a hi/lo neighborhood size of 2, a lowpass neighborhood size of a, no hi/lo blur, hi and low quantile percentages both set at 45% and a scale constant of 128, the face image of FIG. 12b results. FIG. 12c depicts the face image at a hi/lo neighborhood size of 2, a lowpass neighborhood size of 16, no hi/lo blur, hi and low quantile percentages both set at 45% and a scale constant of 128. FIG. 12d depicts the face image at a hi/lo neighborhood size of 8, a lowpass neighborhood size of 16, a hi/lo blur neighborhood size of 16, high and low quantile percentages both set at 45% and a scale constant of 128. FIG. 12e depicts the face image at a hi/lo neighborhood size of 8, a lowpass neighborhood size of 16, a hi/lo blur neighborhood size of 16, high and low quantile percentages both set at 0% and a scale constant of 128.

Notice that it is possible to effectively binarize or adaptively binarize the image using the same normalization routine so that the method can be used for contrast stretching, lighting normalization, and other like purposes. Typical unoptimized computing times for the images of FIGS. 12b–e was approximately 2 seconds on a SPARC 10 (extra delay was caused by the optional blurring and by computing per pixel step rather than per sub-block for the high and low maps).

It should be understood that the embodiments described herein are merely exemplary and that a person skilled in the art may make many variations and modifications to these embodiments utilizing functionally equivalent elements to those described herein. Any and all such variations or modifications as well as others which may become apparent to those skilled in the art, are intended to be included within the scope of the invention as defined by the appended claims.

What is claimed is:

1. A method of normalizing the lighting changes in an input image comprising an X and Y array of pixels having various illuminating intensities, said lighting changes having an additive effect and a multiplicative effect on said input image, said method comprising the steps of:

estimating said additive effect from said input image to provide a background estimate;

deriving high and low quantile maps of said input image;

estimating said multiplicative effect from said input image to provide a gain estimate by taking an absolute difference between said high and low quantile maps and said estimate of said additive effect;

subtracting said background estimate from said image; and, normalizing said image with respect to said gain estimate; wherein said method is implemented as an algorithm:

$$\check{\Gamma}(x, y) = \frac{\kappa}{\hat{\alpha}(x, y)} \cdot (\hat{\Gamma}(x, y) - \hat{\beta}(x, y))$$

wherein $\check{\Gamma}(x,y)$ is a normalized image, $\hat{\Gamma}(x,y)$ is the effect of said lighting changes, said additive effect is $\hat{\beta}(xy)$ and said gain estimate is $\hat{\alpha}(x,y)$.

2. The method according to claim 1, wherein said step of estimating said additive effect comprises filtering said input image through a lowpass filter.

3. The method according to claim 2, wherein said lowpass filter is based on multiresolution.

4. The method according to claim 3, wherein said input image has a predetermined resolution and said step of filtering includes the steps of:

taking block averages of said input image to downsize and provide a low resolution representation of said input image; and rescaling said low resolution representation of said input image to said predetermined resolution.

5. The method according to claim 4, wherein said block averages are nonoverlapping.

6. The method according to claim 4, wherein said step of resealing is performed in a series of stages, wherein each of said stages approaches said predetermined resolution.

7. The method according to claim 1, wherein said high and low quantile maps each have a neighborhood size ranging between 1 and $\infty$ pixels.

8. The method according to claim 1, wherein said background estimate has a neighborhood size ranging between 1 and $\infty$ pixels.

9. The method according to claim 1, wherein said steps of measuring are performed with a rank order filter.

10. The method according to claim 1, wherein said high and low quantile maps each have a quantile percentage ranging from between 0–50%.

11. The method according to claim 1, further comprising the steps of blurring said high and low quantile maps with a lowpass filter to create a blurred high quantile map and a blurred low quantile map.

12. The method according to claim 11, wherein said blurred high and low quantile maps each have a neighborhood size ranging between 1 and $\infty$ pixels.

13. The method according to claim 11, wherein said lowpass filter is based on multiresolution.

14. The method according to claim 1, further comprising a scaling constant ranging between 0 and 128 which describes the operating point of said algorithm.

15. The method according to claim 1, wherein said lighting changes in said input image includes a lighting gradient.

* * * * *